United States Patent [19]
Nanno

[11] Patent Number: 5,628,498
[45] Date of Patent: May 13, 1997

[54] FLUID-FILLED ELASTIC MOUNT

[75] Inventor: Takanobu Nanno, Aichi, Japan

[73] Assignee: Tokai Rubber Industries, Ltd., Komaki, Japan

[21] Appl. No.: 573,635

[22] Filed: Dec. 18, 1995

[30] Foreign Application Priority Data

Dec. 19, 1994 [JP] Japan .................................. 6-315332

[51] Int. Cl.⁶ .................. F16F 13/00; F16M 7/00
[52] U.S. Cl. .................. 267/140.13; 267/35; 267/219
[58] Field of Search .................. 267/140.14, 140.11, 267/140.12, 140.13, 219, 220, 35, 140.2, 64.28; 248/562, 636, 638; 180/300, 312

[56] References Cited

U.S. PATENT DOCUMENTS 4,936,556  6/1990  Makibayashi et al. ............ 267/140.13
4,953,833  9/1990  Schmidt et al. .................... 267/219
5,088,700  2/1992  Kanda et al. ..................... 267/140.13

FOREIGN PATENT DOCUMENTS 2-85539  3/1990  Japan .

*Primary Examiner*—Douglas C. Butler
*Attorney, Agent, or Firm*—Jacobson, Price, Holman & Stern, PLLC

[57] ABSTRACT

A bottomed cylindrical second mounting metal member which defines with a diaphragm a closed air chamber is press-fitted in a fluid bath on a cylindrical metal member secured to an outer periphery of a lower side of a rubber elastic block having a downwadly opening cavity to assemble the second mounting metal member to the cylindrical metal member. As the press-fitting of the second mounting metal member proceeds, the internal pressure of the closed air chamber is increased and the diaphragm is deformed to pressurize the fluid inside a fluid-filled chamber.

2 Claims, 3 Drawing Sheets

FLUID-FILLED ELASTIC MOUNT

BACKGROUND OF THE INVENTION

1. Field of the Invention

The present invention relates to a fluid-filled elastic mount used as an engine mount or body mount of a motor vehicle, for example.

2. Description of the Related Art

Conventionally, a mount shown in FIG. 5 has been known as one example of a fluid-filled elastic mount for supporting an engine of a motor vehicle. This mount includes a first mounting metal member 1a, a rubber elastic block 2a which is secured on its upper side to the first mounting metal member 1a and has on its lower side a cavity, a cylindrical metal member 3a which is secured to an outer periphery of the lower side of the rubber elastic block 2a, a bottomed cylindrical second mounting metal member 4a which is caulked against a lower part of the cylindrical metal member 3a to define with the rubber elastic block 2a a closed space 7a, a diaphragm 5a a peripheral end portion of which is held between the second mounting metal member 4a and the rubber elastic block 2a to divide the closed space 7a into a fluid-filled chamber 8a filled with a fluid L and an air chamber 9a filled with air, and a partition member 6a which partitions the fluid-filled chamber 8a into a main chamber 81a and an auxiliary chamber 82a and defines with the rubber elastic block 2a an orifice passage 65a interconnected with the main chamber 81a and the auxiliary chamber 82a.

The mount thus constructed is assembled to a motor vehicle by securing the first mounting metal member 1a and second mounting metal member 4a to an engine and vehicle body, respectively, with mounting bolts 13a and 45a.

High-frequency vibrations from the engine are effectively absorbed by the elastic deformation of the rubber elastic block 2a, and low-frequency vibrations such as engine shake are effectively absorbed by the fluid mass resonance action of the fluid L passing through the orifice passage 65a due to the volumetric change of the main chamber 81a and the auxiliary chamber 82a. The internal pressure of the auxiliary chamber 82a is absorbed by the elastic deformation of the diaphragm 5a to generate a pressure difference between the auxiiary chamber 82a and the main chamber 81a, which enables a smooth pass of the fluid L through the orifice passage 65a.

In the conventional mount, the molecular motion of saturated air inside the fluid L may be activated due to a long period use in a high-temperature atmosphere, and the cavitation may be generated when high-frequency vibrations are input, which cause the residue of bubbles in the fluid L. In this case, the residual bubbles may block a smooth pass of the fluid L through the orifice passage 65a not to effect the fluid mass resonance action, thus not exhibiting sufficient vibration damping characteristics.

As effective means of restraining the generation and residue of bubbles, it is well known to increase the internal pressure of the fluid L inside the fluid-filled chamber 8a (Japanese patent application laid-open No. Hei 2-85539). The above-described conventional mount is, however, unable to increase the internal pressure of the fluid L inside the fluid-filled chamber 8a sufficiently, because it has a diaphragm 5a adapted to separate the fluid filled chamber 8a from the air chamber 9a so that the fluid filled chamber 8a is defined in part by the diaphragm 5a of low rigidity.

SUMMARY OF THE INVENTION

It is an object of the present invention to provide a fluid-filled elastic mount having a fluid-filled chamber and an air chamber separated from each other with a diaphragm, which exhibits good vibration damping characteristics based on the pass of a fluid with an arrangement capable of increasing the internal pressure of the fluid inside the fluid-filled chamber.

The fluid-filled elastic mount in accordance with the present invention has a first mounting metal member, a rubber elastic block which is secured on its one end side to the first mounting metal member and has on its the other end side a cavity, a cylindrical metal member which is secured to an outer periphery of the other end side of the rubber elastic block, a bottomed cylindrical second mounting metal member which is secured to the outer periphery of the cylindrical metal member to define with the cavity of the rubber elastic block a closed space, a diaphragm a peripheral end portion of which is retained by the second mounting metal member or a cylindrical retaining metal member fitted to the rubber elastic block to divide the closed space into a fluid-filled chamber filled with a fluid and an air chamber filled with air, and a partition member which partitions the fluid-filled chamber into a main chamber and an auxiliary chamber, and defines with the rubber elastic block an orifice passage interconnected with the main chamber and the auxiliary chamber. The fluid inside the fluid-filled chamber is highly pressurized through the increase of the internal pressure of the air chamber and the deformation of the diaphragm due to the press-fitting of the second mounting metal member on the cylindrical metal member.

In a preferred embodiment, a seal member is provided between the second mounting metal member and the cylindrical retaining metal member or the cylindrical metal member to seal the air chamber.

The fluid-filled elastic mount in accordance with the present invention is assembled by press-fitting the second mounting metal member on the cylindrical metal member secured to the rubber elastic block. As the press-fitting of the second mounting metal member proceeds, the internal pressure of the closed air chamber increases and the diaphragm elastically deforms to increase the pressure of the fluid inside the fluid-filled chamber. This restrains generation and residue of bubbles in the fluid, and enables a good fluid mass resonance action of the fluid passing through the orifice passage, thus exhibiting good damping characteristics.

In addition, with the arrangement that the seal member is interposed between the second mounting metal member and the retaining metal member or the cylindrical metal member to seal the air chamber, upon the press-fitting of the second mounting metal member on the cylindrical metal member, the pressures of the air chamber and fluid-filled chamber can be both increased with greater certainty and the pressurized initial state thereof is maintained certainly.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Hereinafter, embodiments of the present invention will be explained with reference to the accompanying drawings.

Figure 1:
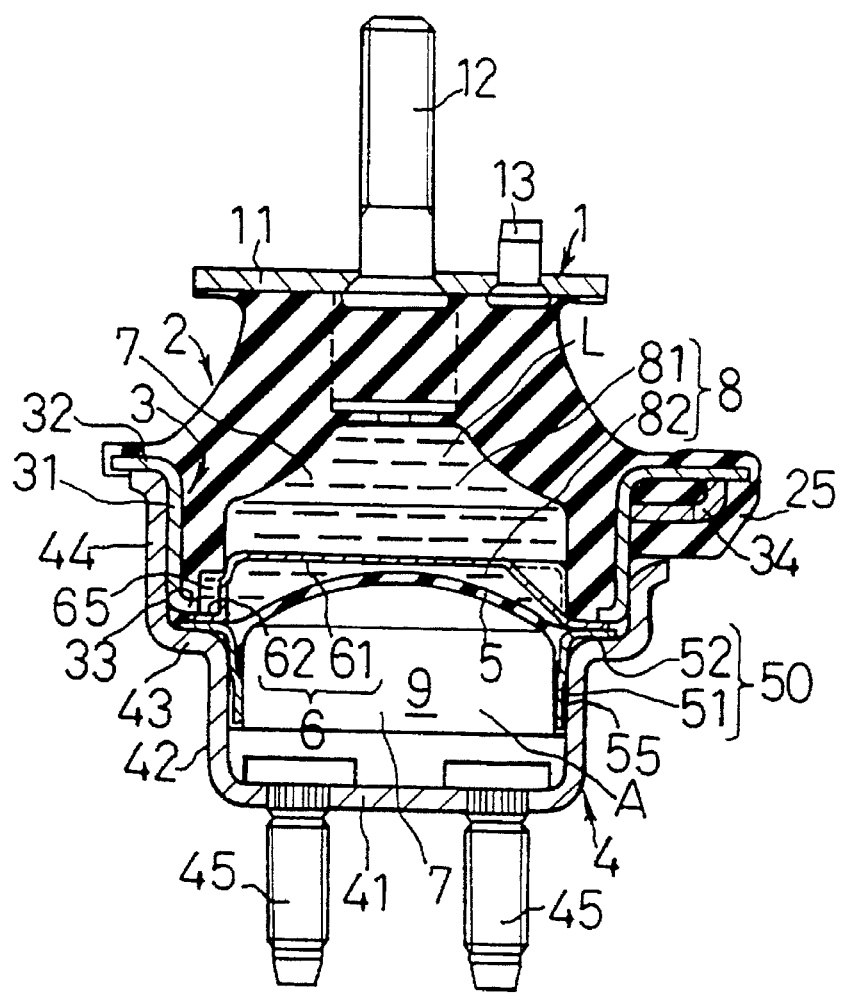
FIG. 1 is a cross-sectional view of a first embodiment of a fluid-filled elastic mount in accordance with the present invention.
Figure 2:
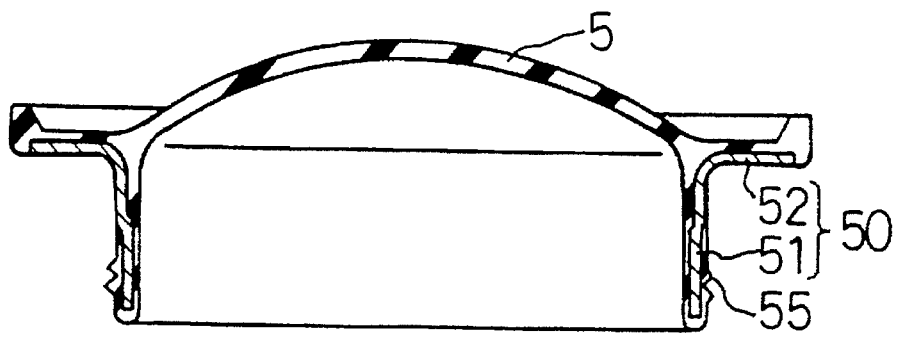
FIG. 2 is a cross-sectional view of a retaining metal member having a seal member used in the first embodiment.

FIG. 1 is a cross-sectional view of a first embodiment and FIG. 2 is a cross-sectional view of a retaining metal member provided with a seal member, which is used in the first embodiment.

The fluid-filled elastic mount of the present embodiment is used as an engine mount for a motor vehicle, and has a first mounting metal member 1, a rubber elastic block 2 secured on its one side to the first mounting metal member 1, a cylindrical metal member 3 secured to the rubber elastic block 2, a second mounting metal member 4 press-fitted on the outer periphery of the cylindrical metal member 3 to define with the rubber elastic block 2 a closed space 7, a diaphragm 5 a peripheral end portion of which is retained by a cylindrical retaining metal member 50 fitted in the second mounting metal member 4 to divide the closed space 7 into a fluid-filled chamber 8 and an air chamber 9, and a partition member 6 which partitions the fluid-filled chamber 8 into a main chamber 81 and an auxiliary chamber 82, and defines with the rubber elastic block 2 an orifice passage 65 which is interconnected with the chambers 81 and 82.

The first mounting metal member 1 is adapted to be secured to a bracket of an engine, and has a circular base plate 11, a mounting bolt 12 projected upwardly from a central part of the base plate 11, and a mounting pin 13 projected upwardly from an end part of the base plate 11.

The rubber elastic block 2 is formed of a rubber material into a generally cylindrical configuration, and has a downwardly opening cavity. An upper end of the rubber elastic block 2 is secured to the under face of the first mounting metal member 1 by vulcanization. An outwardly expanding rubber stopper 25 is formed in about one sixth of the outer periphery of the rubber elastic block 2 integrally therewith. The cylindrical metal member 3 is composed of a cylindrical base part 31, and a ring-like upper flange part 32 which extends outwardly from an upper edge of the base part 31, a ring-like lower flange part 33 which extends inwardly from a lower edge of the base part 31. The inside face of the metal member 3 thus constructed is secured to the outer periphery of a lower half of the rubber elastic block 2 by vulcanization. Within the rubber stopper 25, the cylindrical metal member 3 is partly embedded and a stopper metal member 34 welded to the cylindrical metal member 3 is also embedded.

The second mounting metal member 4 is a bottomed cylindrical body having a circular bottom part 41, an inner cylindrical part 42 which extends upwardly from a peripheral edge of the circular bottom part 41, and an outer cylindrical part 44 which extends upwardly from the inner cylindrical part 42 via a stepped part 43. Two mounting bolts 45 are fixed to the bottom part 41 so as to protect downwardly. The second mounting metal member 4 is assembled outside the cylindrical metal member 3 by press-fitting the outer cylindrical part 44 thereon to define with the cavity of the rubber elastic block 2 a closed space 7.

The diaphragm 5 is formed of a rubber material into a generally dome-like configuration, and the peripheral end part thereof is secured to the retaining metal member 50 by vulcanization. The retaining metal member 50 is composed of a cylindrical part 51, and a ring-like flange part 52 which extends outwardly from the cylindrical part 51. A periphral portion of the diaphragm 5 is bonded to both an inside face of the cylindrical part 51 and an upper face of the flange part 52. As shown in FIG. 2, a seal member 55 having outwardly projecting ring-like ribs is provided along an outside face of the lower portion of the cylindrical part 51.

This retaining metal member 58 is arranged such that the cylindrical part 51 is fitted in the inner cylindrical part 42 of the second mounting metal member 4 and the flange part 52 is held between the stepped part 43 of the second mounting metal member 4 and the lower flange part 33 of the cylindrical metal member 3, whereby the closed space 7 is divided by the diaphragm 5 into the fluid-filled chamber 8 on the side of the rubber elastic block 2 and the air chamber 9 on the side of the second mounting metal member 4.

The fluid-filled chamber 8 is filled with a pressurized fluid L composed of incompressible fluid such as water, alkylene glycol, silicon oil and low molecular weight polymer. The air chamber 9 is filled with air of a high pressure substantially identical to that of the fluid L. The pressures of both the fluid L and air A which respectively fill the fluid-filled chamber 8 and the air chamber 9 are increased in the assemblying step described later by press-fitting the second mounting metal member 4 on the cylindrical metal member 3.

The partition member 6 is formed of a metal sheet into a hat-like configuration, and has a bottomed cylindrical main part 61 opening downwardly, and a ring-like flange part 62 which extends outwardly from a lower edge of the main part 61. This partition member 6 is arranged such that the flange part 62 is held between the lower flange part 33 of the cylindrical metal member 3 and the flange part 52 of the retaining metal member 50 to divide the fluid-filled chamber 8 into the main chamber 81 and the auxiliary chamber 82. A letter C-like orifice passage 65 is defined between the outside face or the partition member 6 and the inside face of the rubber elastic block 2 so as to extend along a substantially entire outside face of a corner between the main part 61 and the flange part The orifice passage 65 is interconnected at its one end with the main chamber 81 and at its the other end with the auxiliary chamber 82 through openings (not shown) which are respectively formed in the main part 61 of the partition member 6.

The fluid L filling the fluid-filled chamber 8 is pressurized in the assemblying step of the fluid-filled elastic mount, as follows.

First, the retaining metal memer 50 to which the diaphragm 5 and the seal member 55 are secured is press-fitted in the inner cylindrical part 42 of the second mounting metal member 4 to form inside the second mounting metal member 4 the air chamber 9 closed with the diaphragm 5. As the press-fitting of the retaining metal member 50 proceeds, the volume of the air chamber 9 decreases to pressurize the air A therein.

Next, an integral body composed of the first mounting metal member 1, cylindrical metal member 3 and rubber elastic block 2 which are bonded together by vulcanization is immersed in a fluid bath filled with the fluid L adapted to fill the fluid-filled chamber 8, and the partition member 6 is placed in a predetermined position of an opening of the cavity of the rubber elastic block 2. Then, the outer cylindrical part 44 of the second mounting metal member 4 is press-fitted on an outer periphery of the cylindrical metal member 3 such that the flange part 52 of the retaining metal member 55 add the flange part 62 of the partition member 6 are held between the stepped part 43 of the second mounting metal member 4 and the lower flange part 33 of the cylindrical metal member 3, thereby forming in the cavity of the rubber elastic block 2 the fluid-filled chamber 8 closed with the diaphragm 5. As the press-fitting of the second mounting metal member 4 proceeds, the fluid-filled chamber 8 is filled with the fluid which is pressurized due to the decrease in volume of the fluid-filled chamber 8. The internal pressure of the fluid-filled chamber 8 is increased through the elastic deformation of the diaphragm 5 in balance with that of the air chamber 9 until the value substantially identical to the internal pressure of the air chamber 9.

The fluid-filled elastic mount of the present embodiment thus constructed is assembled to a motor vehicle by securing the first mounting metal member 1 and the second mounting metal member 4 to the bracket of the engine and the vehicle body, respectively, with the mounting bolts 12 and 45.

High-frequency vibrations generated in an engine are effectively absorbed by the elastic deformation of the rubber elastic block 2, and low-frequency vibrations such as engine shake are effectively absorbed based on the fluid mass resonance action of the liquid L passing through the orifice passage 65 due to the volumetric change of the main chamber 8 and auxiliary chamber 82. With the present embodiment, the fluid L inside the fluid-filled chamber 8 is in the highly pressurized state, so, the possibility of residue of saturated air in the fluid L as bubbles is very small. And bubbles caused by the cavitation may dissolve in the fluid L to disapear. This enables a smooth pass of the fluid L through the orifice passage 65, thus effecting a good fluid mass resonance action.

As described above, the fluid-filled elastic mount of the present embodiment can be assembled by press-fitting the second mounting metal member 4 on the cylindrical metal member 3. In this step, the air chamber 9 is compressed to increase the internal pressure therein and the diaphragm 5 is deformed to pressurize the fluid L inside the fluid-filled chamber 8. Accordingly, with this arrangement, the internal pressure of the fluid L inside the fluid-filled chamber 8 can be readily pressurized in the assemblying step. This restrains generation and residue of bubbles in the fluid L and enables a smooth pass of the fluid L, thus effecting a good fluid mass resonance action and exhibiting excellent vibration damping characteristics.

With the present embodiment, the seal member 55 is provided between the outside face of the retaining metal member 50 and the inside face of the second mounting metal member 4 to seal the air chamber 9. Upon press-fitting the second mounting metal member 4 on the cylindrical metal member 3, leakage of the air A from the air chamber 9 can be prevented by virtue of the seal member 55 so that both the air chamber 9 and the fluid-filled chamber 8 can be highly pressurized with certainty and the pressurized initial state thereof can be maintained with certainty.

Figure 3:
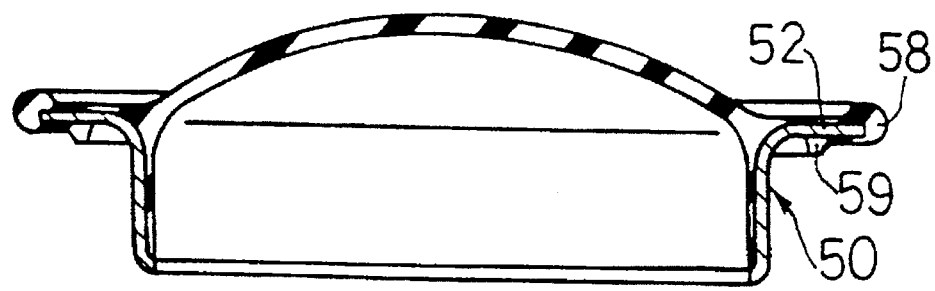
FIG. 3 is a cross-sectional view of a retaining metal member having a seal member used in a modification of the first embodiment.

In the present embodiment, the seal member 55 is provided along the outside face of the cylindrical part 51 of the retaining metal member 50. Alternatively, as shown in FIG. 3, a seal member 58 may be provided along a peripheral edge of the flange part 52 of the retaining metal member 50 so as to be held between the peripheral edge of the flange part 52 and the inside face of the outer cylindrical part 44 of the second mounting metal member 4. To enhance the airtightness, another seal member 59 may be provided on an under face of the flange part 52 of the retaining metal member 50 to seal the air chamber 9 with the stepped part 43 of the second mounting metal member 4.

Figure 4:
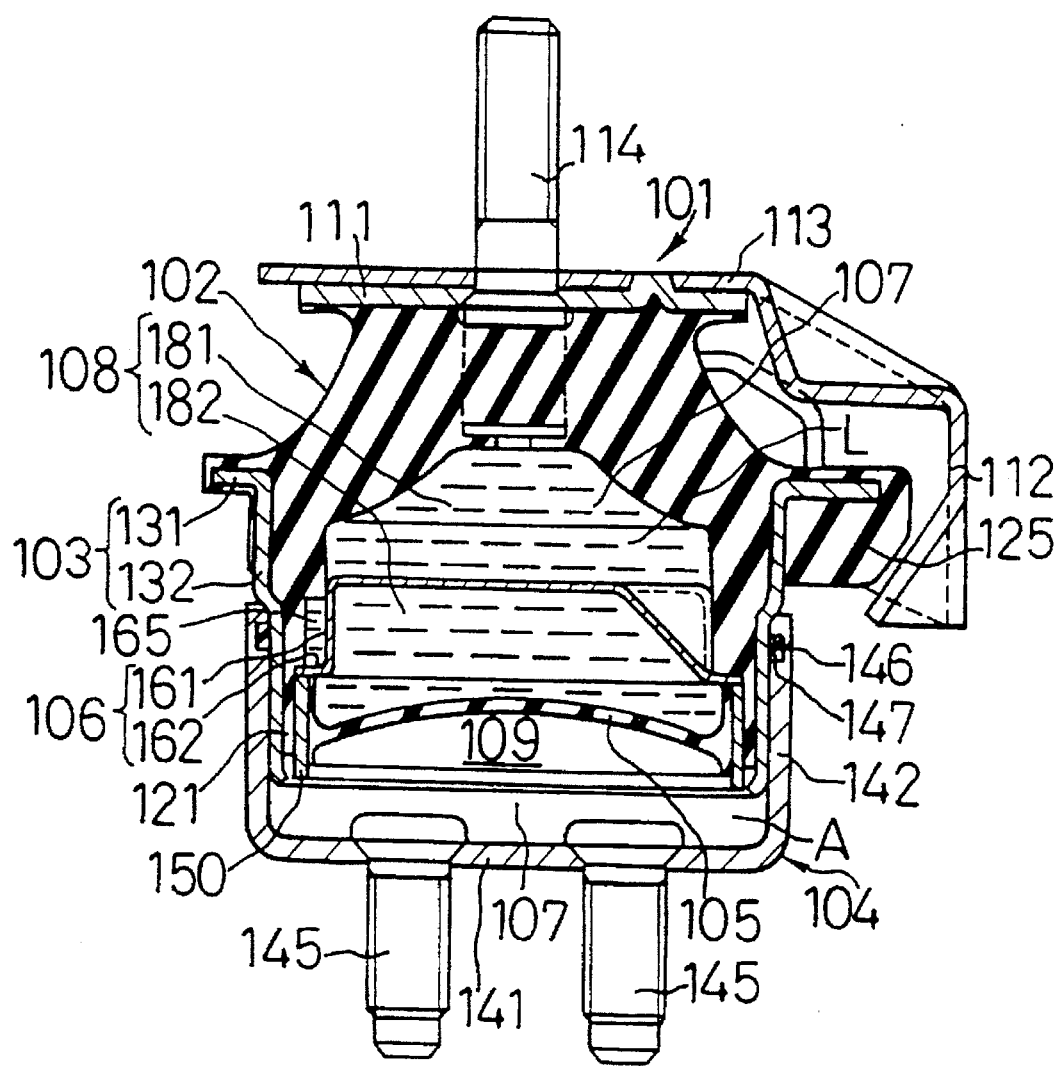
FIG. 4 is a cross-sectional view of a second embodiment of a fluid-filled elastic mount in accordance with the present invention.
Figure 5:
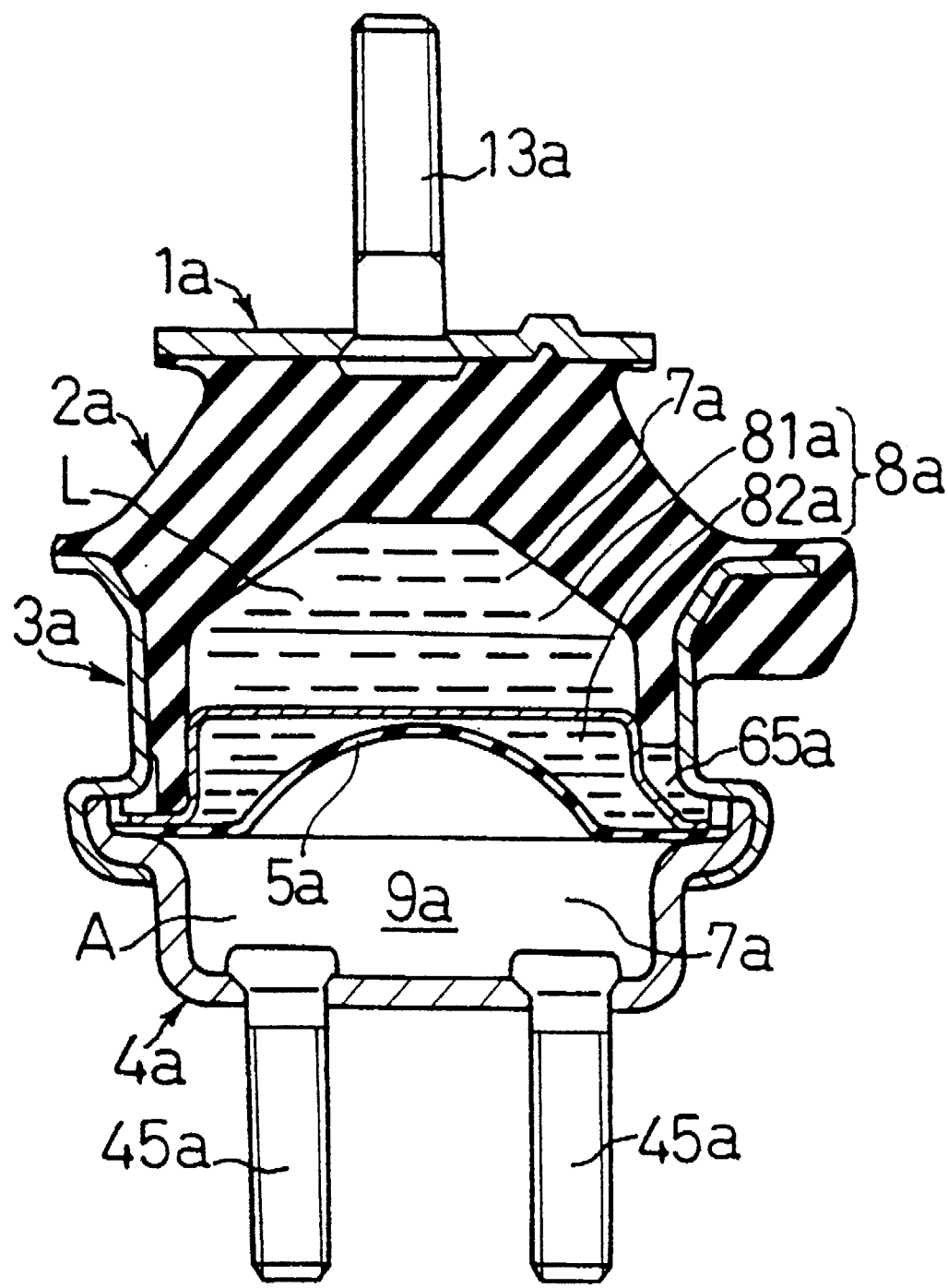
FIG. 5 is a cross-sectional view of a conventional fluid-filled elastic mount.

FIG. 4 illustrates a cross-section of a fluid-filled elastic mount of the second embodiment.

In the present embodiment, a fluid-filled chamber is first sealed with a diaphragm, and then, a second mounting metal member is press-fitted to form a closed air chamber.

The fluid-filled elastic mount of the present embodiment has a basic construction substantially identical to that of the first embodiment, which includes a first mounting metal member 101, a rubber elastic block 102, a cylindrical metal member 103, a second mounting metal member 104, a diaphragm 105 retained by a retaining metal member 150, and a partition member 106.

The first mounting metal member 101 includes a circular base plate 111, a stopper plate 113 which is superimposed on the upper face of the base plate 111, and has a sideward extending stopper part 112, and a mounting bolt 114 projected upwardly from a central part of the base plate 111.

The rubber elastic block 102 is formed of a rubber material into a generally cylindrical configuration, and has a downwardly opening cavity. The rubber elastic block 102 is secured at its upper end to the under face of the base plate 111 by vulcanization, and defines at its lower end a thin-walled cylindrical seal part 121. A rubber stopper 125 is formed along an outer periphery of the rubber elastic block 102 integrally therewith towards the stopper part 112 of the stopper plate 113.

The cylindrical metal member 103 has a generally cylindrical base part 132 and a ring-like upper flange part 131 which extends outwardly from an upper edge of the base part 132. The cylindrical metal member 103 thus constructed is secured in its inside face to the outer periphery of a lower half of the rubber elastic block 102 by vulcanization. Within the rubber stopper 125 of the rubber elastic block 102, the cylindrical metal member 103 is partly embedded.

The second mounting metal member 104 has a bottomed cylindrical configuration, and includes a circular bottom part 141 and a cylindrical part 142 which extends upwardly from a peripheral edge of the circular bottom part 141. Two mounting bolts 145 which will be secured to a bracket of a vehicle body are fixed to the bottom part 141 so as to project downwardly. The second mounting metal member 104 is secured to an outside face of the cylindrical metal member 103 by press-fitting the cylindrical part 142 thereon to define with the cavity of the rubber elastic block 102 a closed space 107. A ring-like groove 146 is formed in an inside face of an upper part of the cylindrical part 142, and a seal member 147 is disposed within this ring-like groove 146.

The diaphragm 105 is formed of a rubber material into a generally dome-like configuration, and the peripheral end part thereof is secured to the cylindrical retaining metal member 150 by vulcanization. The retaining metal member 150 is press-fitted in an inner periphery of the seal part 121 of the rubber elastic block 102, whereby the closed space 107 is divided by the diaphragm 105 into a fluid-filled chamber 108 on the side of the rubber elastic block 102 and an air chamber 109 on the side of the second mounting metal member 104.

The fluid-filled chamber 108 is filled with a pressurized fluid L composed of incompressible fluid, and the air chamber 109 is filled with air A of a high pressure substantially identical to that of the fluid L. The fluid L and air A which respectively fill the fluid-filled chamber 108 and air chamber 109 are pressurized by press-fitting the second mounting metal member 104 on the cylindrical metal member 103 in the assemblying step described later.

The partition member 106 is composed of a bottomed cylindrical main part 161 opening downwardly, and a ring-like flange part 162 which extends outwardly from the lower edge of the main part 161. This partition member 106 is arranged such that the flange part 162 is held between a stepped part formed in the inside face of the rubber elastic block 102 and an upper end face of the retaining metal member 150 to divide the fluid-filled chamber 108 into a main chamber 181 and a fluid chamber 182. A letter C-like orifice passage 165 is defined between an outside face of the partition member 106 and an inside face of the rubber elastic block 102 such that it extends along a substantially entire outside face of a corner between the main part 161 and the flange part 162. The orifice passage 165 is interconnected at its one end with the main chamber 181 and at its other end with the auxiliary chamber 182 through openings (not shown) respectively formed in the main part 161 of the partition member 106.

The fluid L filling the fluid-filled chamber 108 is pressurized in the assembling step of the fluid-filled elastic mount of the present embodiment, as follows.

First, an integral body composed of the first mounting metal member 101, cylindrical metal member 103 and rubber elastic block 102 which are bonded together by vulcanization, is immersed in a fluid bath filled with a fluid L adapted to fill the fluid-filled chamber 108, and the partition member 106 is placed in a predetermined position of the cavity or the rubber elastic block 102. Then, the retaining metal member 150 to which the diaphragm 105 is secured is press-fitted in the inner periphery of the seal part 121 of the rubber elastic block 102, thereby forming within the cavity of the rubber elastic block 102 the fluid-filled chamber 108 which is divided into the main chamber 181 and the auxiliary chamber 182 with the partition member 106, closed with the diaphragm 105, and filled with the fluid L.

Next, the integral body with the retaining metal member 150 is removed from the fluid bath, and the second mounting metal member 4 to which the seal member 147 is assembled is press-fitted on the outer periphery of the cylindrical metal member 103, thus forming the air chamber 109 between the second metal member 104 and diaphragm 105, which is filled with a pressurized air A. As the press-fitting of the second mounting metal member 104 proceeds, the volume of the air chamber 109 decreases to increase the internal pressure thereof, and the diaphragm 105 elastically deforms to increase the internal pressure of the fluid L inside the fluid-filled chamber 108 in balance with that of the air chamber 109.

The fluid-filled elastic mount of the present embodiment thus constructed is assembled to a vehicle body, similarly to the first embodiment, and effectively absorbs vibrations from an engine by the elastic deformation of the rubber elastic block 102 and the fluid mass resonance action of the fluid L passing through the orifice passage 165. With the present embodiment, the fluid L inside the fluid-filled chamber 108 is highly pressurized to restrain generation and residue of bubbles in the fluid L and enable a smooth pass of the fluid L through the orifice passage 165, thus effecting a good fluid mass resonance action.

As described above, with the fluid-filled elastic mount of the present embodiment, the fluid L filling the fluid-filled chamber 108 can be readily pressurized in the assemblying step, like the first embodiment. This restrains generation and residue of bubbles in the fluid L and enables a smooth pass of the fluid L, thus effecting a good resonance action and exhibiting excellent vibration-damping characteristics.

With the present embodiment, the air chamber 109 is sealed with the seal member 147 disposed in the ring-like groove 146 of the second mounting metal member 104. With this arrangement, upon the press-fitting of the second mounting metal member 104 on the cylindrical metal member 103, leakage of the air A from the air chamber 109 can be prevented so that both the air chamber 109 and the fluid-filled chamber 108 can be highly pressurized with certainty and the pressurized initial state thereof can be maintained with certainty.

The fluid-filled elastic mount in accordance with the present invention is constructed such that the fluid inside the fluid-filled chamber is highly pressurized through the increase in the internal pressure of the air chamber and the deformation of the diaphragm due to the forcibly fitting of the second mounting metal member on the cylindrical metal member. With this arrangement, the internal pressure of the fluid inside the fluid-filled chamber can be readily increased in the assemblying step. This enables the restraint of generation and residue of bubbles, thus affecting a good fluid mass resonance action due to a smooth pass of the fluid, and exhibiting excellent vibration damping characteristics.

Furthermore, with the arrangement that a seal member adapted to seal the air chamber is interposed between the second mounting metal member and the retaining metal member or the cylindrical metal member, pressurization of both the air chamber and the fluid-filled chamber can be effected with greater certainty, and the pressurized initial state thereof can be maintained with certainty.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A fluid-filled elastic mount comprising:

a first mounting metal member;

a rubber elastic block having two end sides, said rubber elastic block being secured on one end side of said two end sides to said first mounting metal member and having a cavity on the other end side of said two end sides;

a cylindrical metal member which is secured to an outer periphery of said other end side of said rubber elastic block;

a bottomed cylindrical second mounting metal member which is secured to an outer periphery of said cylindrical metal member to define with said cavity of said rubber elastic block a closed space;

a diaphragm, a peripheral end portion of which is retained by one of said second mounting metal member and a cylindrical retaining metal member fitted to said rubber elastic block to divide said closed space into a fluid-filled chamber filled with a fluid, and an air chamber filled with air; and a partition member which partitions said fluid-filled chamber into a main chamber and an auxiliary chamber, and defines with said rubber elastic block an orifice passage interconnected with said main chamber and said auxiliary chamber, said fluid inside said fluid-filled chamber being pressurized through the increase of the internal pressure of said air chamber and the deformation of said diaphragm due to the forcibly fitting of said second mounting metal member on said cylindrical metal member.

2. The fluid-filled elastic mount as claimed in claim 1, further comprising:

a seal member provided between said second mounting metal member and one of said cylindrical retaining metal member and said cylindrical metal member to seal said air chamber.

* * * * *